United States Patent [19]

Gould

[11] Patent Number: 5,301,959
[45] Date of Patent: Apr. 12, 1994

[54] SEALING GLAND

[75] Inventor: Colin A. Gould, Suffolk, England

[73] Assignee: British Telecommunications public limited company, London, England

[21] Appl. No.: 852,189

[22] PCT Filed: Oct. 4, 1990

[86] PCT No.: PCT/GB90/01516

§ 371 Date: May 29, 1992

§ 102(e) Date: May 29, 1992

[87] PCT Pub. No.: WO91/05282

PCT Pub. Date: Apr. 18, 1991

[30] Foreign Application Priority Data

Oct. 4, 1989 [GB] United Kingdom ............... 8922355

[51] Int. Cl.$^5$ .............................................. F16J 15/04
[52] U.S. Cl. ................................ 277/184; 277/187; 174/77 R; 385/83; 385/94
[58] Field of Search ............... 277/1, 72 FM, 75, 105, 277/203, 9, 167, 167.5, 101, 184, 187; 385/27, 39, 76, 83, 94; 174/76, 77 R

[56] References Cited

U.S. PATENT DOCUMENTS

| | | | |
|---|---|---|---|
| 2,987,570 | 6/1961 | Bluth | 174/77 R |
| 3,144,218 | 8/1964 | Tepe | 242/107.1 |
| 3,245,120 | 4/1966 | Levy, Jr. | 174/77 R X |
| 3,781,456 | 12/1973 | Knowles et al. | 277/1 X |
| 3,879,575 | 4/1975 | Dobbin et al. | 174/76 X |
| 4,186,996 | 2/1980 | Bowen et al. | 385/94 X |
| 4,253,729 | 3/1981 | Rocton | 385/76 |
| 4,262,913 | 4/1981 | Parfree et al. | 277/1 |
| 4,332,975 | 6/1982 | Dienes | 174/77 R X |
| 4,598,290 | 7/1986 | Collins et al. | 340/850 |
| 4,607,469 | 8/1986 | Harrison | 174/77 R X |
| 4,622,436 | 11/1986 | Kinnan | 277/1 X |
| 4,626,721 | 12/1986 | Ouchi | 174/76 X |
| 4,647,146 | 3/1987 | Karr. III et al. | 385/39 X |
| 4,767,173 | 8/1988 | Priaroggia | 385/94 X |

FOREIGN PATENT DOCUMENTS

| | | |
|---|---|---|
| 3545849 | 7/1985 | Fed. Rep. of Germany . |
| 3403442 | 8/1985 | Fed. Rep. of Germany . |
| 2588670 | 4/1987 | France . |
| 0128793 | 11/1978 | Japan ............... 174/76 |
| 0075602 | 3/1991 | Japan ............... 385/94 |
| 2197287 | 5/1988 | United Kingdom . |

Primary Examiner—William A. Cuchlinski, Jr.
Assistant Examiner—Scott W. Cummings
Attorney, Agent, or Firm—Nixon & Vanderhye

[57] ABSTRACT

A gland seal comprises a plurality of sealing plates (24, 28, 30) sealingly received in a bore (12). Each pair of adjacent plates define between them a sealing channel (42). The channels are linked by elongate slots (41) in the plates to define a generally helical path. The channels are filled with a sealant through a filling hole (54) at one end of its respective channel.

17 Claims, 2 Drawing Sheets

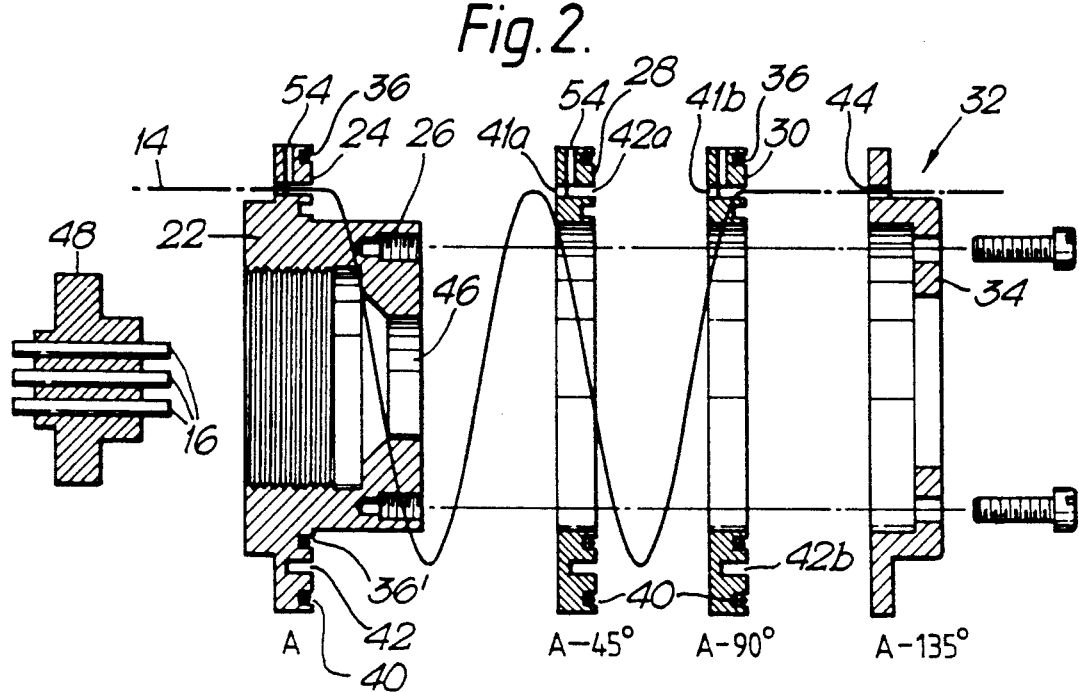
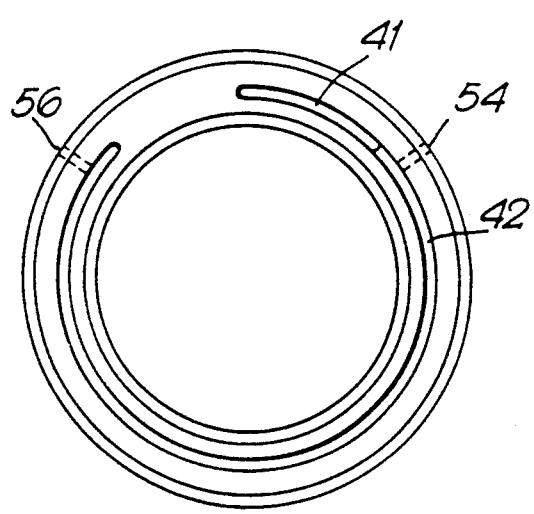
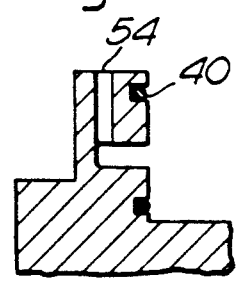

SEALING GLAND

FIELD OF THE INVENTION

This invention relates to sealing glands.

BACKGROUND OF THE INVENTION

There are many applications in which a flexible elongate element such as a line or conduit requires sealing at an interface between two environments between which there is a high pressure differential. The boundary may be constituted by a bulkhead at which the sealing must be performed. The element may, for example, be an optical fibre for monitoring conditions on one side of the boundary. Another example is a fine tube used for capillary sampling of material on one side of the boundary.

It is particularly important to provide highly reliable seals for such elements at interfaces in many different applications, for example the chemical and food processing and nuclear industries, in which the consequences of leakage of fluid past the seal can be severe.

Another field in which the reliability of seals is very important is that of undersea telecommunication elements, for example optical fibres, in which stretches of telecommunication cable are interrupted by repeaters at which the signal in the fibres is boosted. The seal between the fibre and the repeater housing must be designed to withstand the extreme pressures at considerable depths for a projected life time of 25 years or more.

Sealing glands are known for undersea optical communication fibres which comprise a metallised fibre soldered into a cylindrical body screwed into a bulkhead flange and also an electrode embedded in insulating ceramics also screwed into bulk head flange for power feed connections. In both cases the gland assembly comes as a unit with approximately 1 meter lengths of fibre sealed in place which are spliced to the fibres of the incoming cable, on one side, and to the receiving fibres inside the repeater housing, on the other.

In both cases, the gland comprises a tubular arrangement extending out of the housing in line with the cable. The radial thickness of the arrangement is considerable in comparison with the cable to be sealed in order for it to be strong enough to withstand the pressures at depth. It is also made long enough in order to provide sufficient sealing contact between the sealing material and both the cable and the housing. Both of these factors have to be taken into account when designing the housing and can necessitate a more bulky housing shape than would otherwise be the case.

SUMMARY OF THE INVENTION

It is an object of the present invention to provide a less bulky yet still reliable seal than known seals.

It is also an object of the invention to provide a versatile seal the components of which it is possible to vary to suit a particular application.

According to the present invention there is provided a gland seal for sealing a flexible elongate element passing through an aperture in a boundary, the seal comprising a set of sealing plates, each adjacent pair of plates defining at least one sealing channel between them, each plate having an aperture through which, in use, the line to be sealed extends into the associated sealing channel, the line being sealingly engaged in the channel to inhibit the passage of fluid therethrough.

The seal provided by the assemblage of plates can be applied to existing elements without the need for it to be formed as a sealed unit and attached, i.e. spliced, to the ends of elements an either side of the boundary.

The channels defined between the assemblage of plates may be packed out with different sealants according to the application in which the gland is used. Furthermore, different sealants can be used between adjacent plates in the same gland in order to address differing sealing requirements on either side of the seal.

Alternatively, the plates may be resilient and sealingly engage the line to define the sealing channel.

The channels defined in the plates are preferably disposed substantially normally to the path of the line passing through the boundary to which the seal is attached. In this case, the assembly is also particularly compact.

The present invention can be put into practice in several ways one of which will now be described by way of example with reference to the accompanying drawings in which:

BRIEF DESCRIPTION OF THE DRAWINGS

FIG. 2 is an exploded view of the seal of FIG. 1;

FIG. 3 is a end view of the face of a plate constituting part of the seal of FIG. 1; and FIG. 4 is a sectional view of part of the plate of FIG. 3.

DETAILED DESCRIPTION OF THE DRAWINGS

Figure 1:
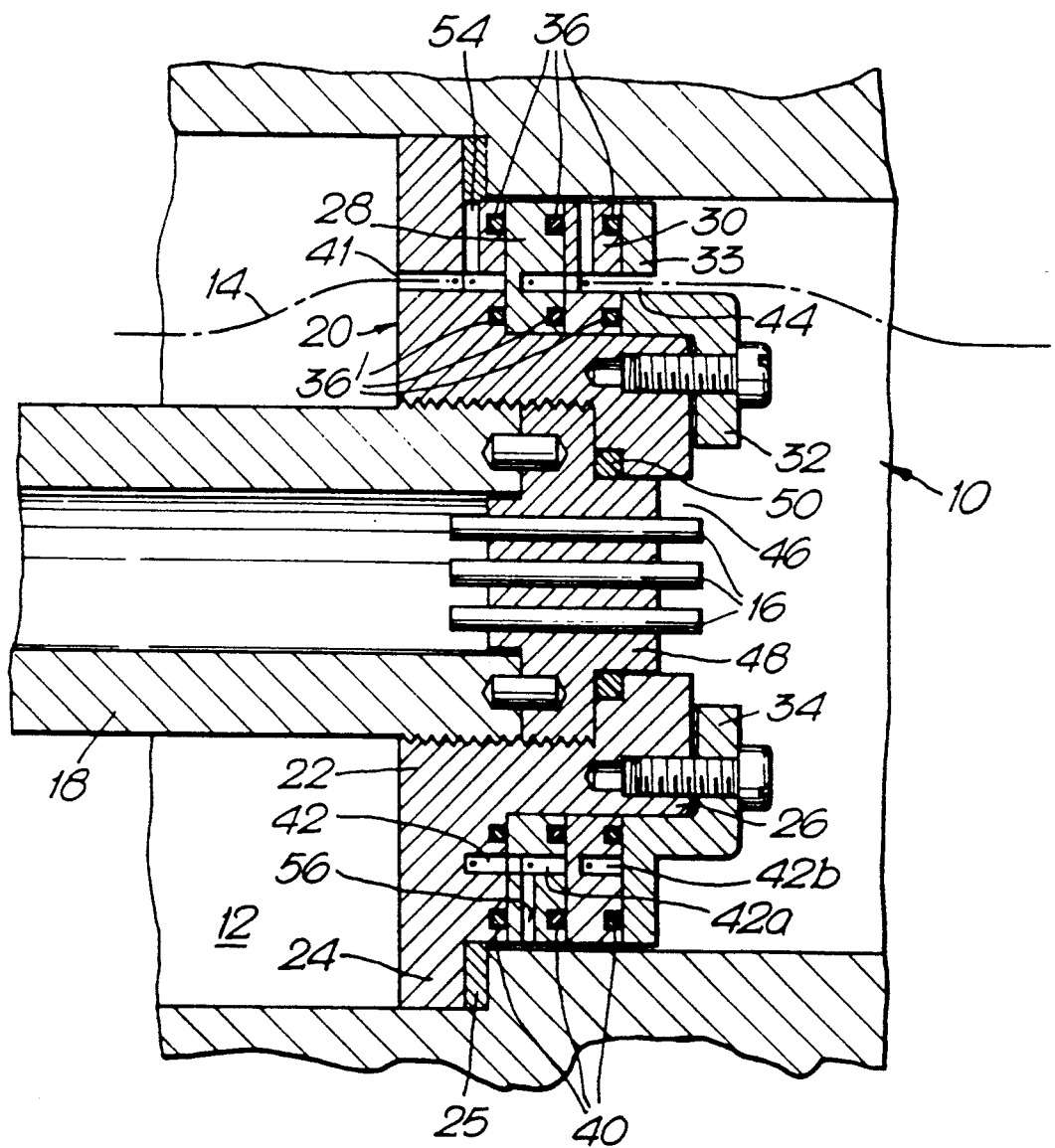
FIG. 1 is a cross-section through an optical fibre seal according to the invention.

Referring to the drawings, a seal 10 is secured within an aperture 12 formed in a repeater housing through which the components of a cable, comprising optical fibres 14 and various electrical command and wires 16, pass from a subsea environment generally to the left in FIG. 1, into the sealed environment of the housing containing the electronic repeater circuitry.

The part of the cable illustrated in FIG. 1 is only the terminating end portion 18 which is secured to the cable itself to enable it to be mounted on the seal. In terminating the cable, the optical fibres are separated from the command wires before they reach the seal.

The gland comprises a main boss plate 20 on the seaward side, consisting of an annular collar 22 having a radially outwardly extending flange 24 at the seaward end of the boss plate 20. Thus, the boss plate 20 has an annular boss portion 26 extending into the repeater from the flange 24. The flange abuts a lead sealing washer 25 located on an annular ledge in the bulkhead defining the aperture 12.

One or more (in this case two) gland plates 28, 30 are received on the boss portion 26. These are held in place by a packing ring 32, also received on the boss portion 26, comprising an annular flange 33 which mates with the repeater-side plate 30.

The packing ring 32 extends away from the plates 28, 30 in the form of a short co-axial sleeve section that is formed with a radially inwardly extending collar 34 which extends over the end of the boss portion 26. The packing ring 32 is secured to the end of the boss portion 26 by bolts, thus urging the plates towards the flange 24.

In order to seal between the mated faces of the plates, the repeater-side mating face of each plate is formed with a radially outer circular recess 36 which, together with the adjacent seaward-side mating face, forms a square section channel in which a O-ring seal 40 is located.

Each of the mating faces formed with the channel 38 is also formed with a radially inner recess 36' defining a square section channel with the adjacent seaward-side mating face.

Each plate 20, 28, 30 is also formed with a sealing channel along which the fibre passing into the repeater housing runs. From the seaward-side, the fibre enters an arcuate slot 41 in the flange 24. The slot 41 guides the fibre into a first circular sealing channel defined by a groove 42 in the flange 24 and the adjacent flat mating face of the neighboring plate 28. The angle of entry of the fibre through the slot is acute with respect to the direction normal to the cross-section depicted in FIG. 1. This allows the fibre to assume the pattern of the groove with the minimum of stress induced by bending.

The shape and extent of the slot 41 and groove 42 are best illustrated in FIG. 3. The slot 41 covers an arc of about 25 degrees. The fibres then follow a 270 degree circular path along the groove 42 up to a point about 90 degrees from the end of the slot.

A similar slot 41a in adjacent plate 28 is in registry with the end of the groove 42. Thus, the fibre passes from the groove 42 through the slot 41a into a similar groove 42a in the adjacent plate 28 at a similarly acute angle.

The fibre follows the 270 degree circular path in the plate 28 and enters a further slot 41b in the next adjacent plate 30 which is angularly shifted by a further 45 degrees. In order to ensure that the plates are correctly angularly relatively positioned, each one may be provided with a locating pin or other detent which engages a hole or other recess in the adjacent plate.

The detail of the slots and grooves are shown in FIG. 2. Here, it will be noted that each disassembled plate is rotated by 45 degrees with respect to adjacent plates in order that the slots clearly can be seen. When assembled, each plate is offset by 45 degrees from its neighbor in order that the slots register with the end of an adjacent groove. After the fibre has passed around the sealing channel defined by the groove 42b in the plate 30, it exits through a similar slot 44 in the packing ring 32. The slots are elongate to provide a smooth, transition between one channel and another in order that the bending stresses in the fibre are as small as possible.

The boss plate 20 is formed with a central bore 46 having a screw thread on its internal wall. In order to seal the bore a sealing plate 48 is mounted on the terminating end 18 of the cable. The sealing plate may be made of glass, ceramic or some other insulating material. Conveniently, it may be moulded with the command wires in place in order to provide a particularly sound seal. When no command wires are to pass through, a steel blanking is used in place of the sealing plate 48.

A sealing O-ring 50 is located within a square-section channel between the sealing plate and the boss plate 20. As the terminated end of the cable is tightened in the bore, the O-ring 50 seals between the sealing plate 48 and the boss plate 20. Alternatively, the bore could be sealed using any other sealing arrangement, such as a flanged face on the end 18 of the terminated cable mating with a similar face on the boss plate.

The sealing channel in each plate is filled with a sealing material. Each channel may be filled with a different material in accordance with the requirements dictated by the environments to be sealed from one another and/or the fibre or other line passing through the seal. For example, the channel in the first plate may have a chemically inert sealant buffer which protects a silicon rubber sealant and/or a solid sealant, such as epoxy, in the next channels. Another suitable sealant is viscous material, such as polyisobutadene. It will be appreciated that the seal is designed to be complete. However, for searching gases, such as helium and hydrogen, a leak rate within acceptable limits of, say $10^{-9}$ cc/sec/atmosphere is tolerated. As a practical matter a leak rate of this sort still constitutes a seal and the word "seal" is intended to embrace this.

To fill each sealing channel, each plate is provided with a cross-bore drilled filling hole 54 at one end of its channel and a similar riser 56 at the other end. The assembly can be assembled and filled with sealant once assembled to ensure an adequate seal is created around the fibre that will not be disturbed by subsequent relative movement between the parts. Typical materials for the sealant are epoxy, silicon rubber or a high viscosity material. Before the fibre, or bunch of fibres, is threaded along the channels it may be pre-coated with sealant. Additional sealant can be injected after the seal is assembled. Once the sealant has been injected the filling holes 54 and risers 56 are closed off using grub screws threadedly received in the holes.

In certain applications the boss plate 20 may not be required to have a bore, in which case the seal is required of the plates alone.

Suitable materials for the boss plate and plates are bronze, brass, steel- or copper-based alloys. However, the choice of material will be dictated, to a large extent, by the application to which the seal is put.

The invention provides a versatile seal which can have one or more plates to define any number of channels. The boss plate 20 may also be separated into two separate components, namely the boss and a plate similar to those plates 28 and 30. The number of plates which can be used is limited only by the size of the boss portion 26. By winding &the fibre to be sealed in an effectively helical fashion the length of sealing engagement is made extensive in a compact space.

It will be apparent to the skilled person that the sealing arrangement of the present invention finds application in many different fields where a versatile and compact seal is required for an elongate flexible element across a boundary between environments having a high pressure differential between them.

I claim:

1. A gland seal for sealing a flexible elongate element passing through an aperture in a boundary, the seal comprising a set of one or more sealing plates and at least one end plate, each sealing plate having a pair of faces which are in contact with either the faces of adjacent sealing plates or a face of an end plate, each pair of adjacent faces defining at least one sealing channel between them; the sealing channel being in the form of an arcuate groove, each sealing plate including at or near an end of the arcuate groove a slot or hole through the sealing plate, said slot or hole providing a passageway to a further sealing channel or providing a passageway to exit the seal, said sealing and end plates being connected so that when the seal is in use, the flexible elongate element extends through an aperture in an end plate and into and along a first sealing channel, and further extends through said slot or hole in a sealing plate to exit the seal or to extend into a further sealing channel located between a further pair of adjacent faces of sealing plates and through a hole or slot in a further sealing plate such that the flexible elongate element extends along a substantially helical path through the seal, the flexible elongate element being sealingly engaged in each arcuate groove to inhibit the passage of fluid therethrough.

2. A seal as in claim 1 in which the arcuate groove is located in one of the adjacent faces of each sealing plate.

3. A seal as in claim 1 in which each plate is also formed with an inlet and an outlet communicating with the channel through which a sealant is injectable into the channel.

4. A seal as in claim 3, in which the sealant is chosen from a group consisting of epoxy, silicon rubber and polyisobutadene.

5. A seal as in claim 3, in which said inlet and outlet are at opposite ends of the sealing channel defined between a pair of sealing plates.

6. A seal as in claim 1 in which the plates lie substantially normally with respect to the overall path of the flexible elongate element to be sealed.

7. A seal as in claim 1 in which the plates are annular, the seal further including a boss on which the plates are held in sealing engagement.

8. A seal as in claim 7 in which a retaining collar is secured to the boss to hold the plates in place.

9. A seal as in claim 7 in which the boss and a first one of the plates is of a unitary construction.

10. A seal as in claim 8 in which the boss and a first one of the plates is of a unitary construction.

11. A seal as in claim 1 in which the hole or slot in each sealing plate communicating with a sealing channel is an elongate slot extending along the general direction of the channel.

12. A seal as in claim 11 in which the hole or slot extends from one face of its associated plate to the other.

13. A seal as in claim 1 in which the plates are located and sealingly engaged with the boundary aperture by means of a radial flange on one plate.

14. A seal as in claim 1 in which a sealing plate is sealingly received within a bore extending through said set of plates.

15. A seal as in claim 1 in which the flexible elongate element is an optical fibre or group of optical fibres.

16. A seal as in claim 1 in which the flexible elongate element is a hollow tube.

17. A gland seal for sealing a flexible elongate element passing through an aperture in a boundary, said seal comprising an assembly of adjacent plates, each said plate including a pair of opposing substantially planar surfaces, one such surface of each plate being in contact with at least one surface of an adjacent plate, each adjacent pair of said plates including an elongated arcuate sealing channel formed in at least one of the adjacent contacting surfaces, each said plate including an aperture communicating with an end of at least one said sealing channel, said flexible elongate element extending along a substantially helical path formed by said apertures and at least one arcuate sealing channel, said flexible elongate element being sealingly engaged in the at least one arcuate sealing channel so as to inhibit the passage of fluid therethrough.

* * * * *